United States Patent
Billault

(10) Patent No.: US 9,915,269 B2
(45) Date of Patent: Mar. 13, 2018

(54) DEVICE FOR CONNECTING A FRONT FRAME TO A FAN CASING

(71) Applicant: AIRCELLE, Gonfreville l'Orcher (FR)

(72) Inventor: Romain Billault, Montivilliers (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 1088 days.

(21) Appl. No.: 14/161,595

(22) Filed: Jan. 22, 2014

(65) Prior Publication Data

US 2014/0133977 A1    May 15, 2014

Related U.S. Application Data

(63) Continuation of application No. PCT/FR2012/051692, filed on Jul. 17, 2012.

(30) Foreign Application Priority Data

Jul. 25, 2011 (FR) ...................................... 11 56751

(51) Int. Cl.
  *F04D 29/40* (2006.01)
  *F01D 25/24* (2006.01)
  *F02K 1/80* (2006.01)

(52) U.S. Cl.
  CPC ......... *F04D 29/403* (2013.01); *F01D 25/243* (2013.01); *F02K 1/80* (2013.01)

(58) Field of Classification Search
  CPC . F02K 1/80; F02K 1/54; F01D 25/243; F05D 2240/90; F05D 2260/30; F05D 2260/37
  See application file for complete search history.

(56) References Cited

U.S. PATENT DOCUMENTS

2011/0014044 A1*  1/2011  Vauchel ................. B64D 29/06
                                                     415/214.1
2011/0070078 A1   3/2011  Paprotna et al.

FOREIGN PATENT DOCUMENTS

| EP | 1 605 152 A1 | 12/2005 |
| FR | 2927061 | * 1/2008 |
| FR | 2 907 098 A1 | 4/2008 |
| FR | 2 952 908 A1 | 5/2011 |

(Continued)

OTHER PUBLICATIONS

International Search Report dated Sep. 6, 2012 in International Application No. PCT/FR2012/051692.

*Primary Examiner* — Woody Lee, Jr.
*Assistant Examiner* — Maxime Adjagbe
(74) *Attorney, Agent, or Firm* — Burris Law, PLLC

(57) ABSTRACT

A device for connecting a front frame of a turbojet engine nacelle to a fan casing includes a locking pin connected to a first assembly flange and a retaining flange that is movably mounted and has at least one opening. In particular, the locking pin has a shank passing through an orifice of a second assembly flange secured to the fan casing. The opening is crossed through by the shank of the locking pin and interacts with an end groove of said locking pin. When the retaining flange is in the unlocking position, the opening has dimensions larger than those of the shank of the locking pin, and when the retaining flange is in the locking position, the opening has dimensions larger than a thickness of the locking pin at its groove but smaller than an overall thickness of the shank of the orifice of the second flange.

6 Claims, 1 Drawing Sheet

(56) References Cited

FOREIGN PATENT DOCUMENTS

FR 2 970 513 A1 7/2012
GB 2 384 827 A 8/2003

* cited by examiner

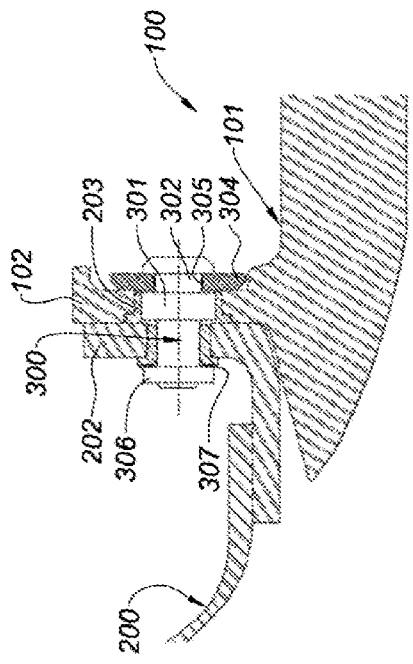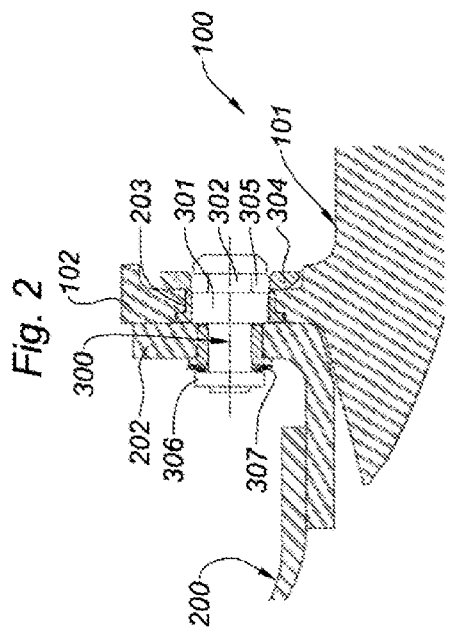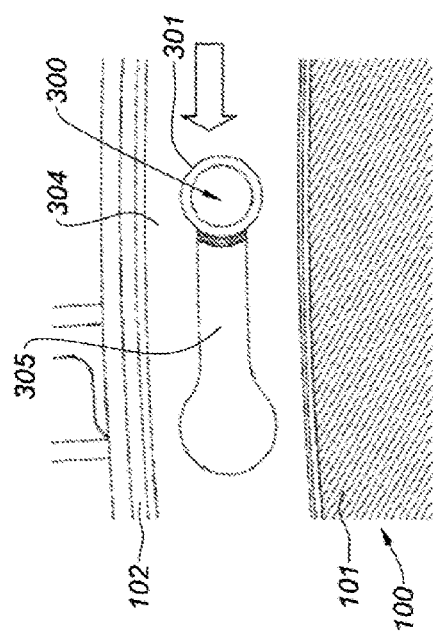

DEVICE FOR CONNECTING A FRONT FRAME TO A FAN CASING

CROSS-REFERENCE TO RELATED APPLICATIONS

This application is a continuation of International Application No. PCT/FR2012/051692, filed on Jul. 17, 2012, which claims the benefit of FR 11/56751, filed on Jul. 25, 2011. The disclosures of the above applications are incorporated herein by reference.

FIELD

The present disclosure relates to a device for connecting a front frame of a thrust reverser to a fan casing or other junctions of the same type, and a nacelle incorporating such a device.

BACKGROUND

The statements in this section merely provide background information related to the present disclosure and may not constitute prior art.

As is known in itself, an aircraft propulsion assembly traditionally comprises a turbojet engine housed inside a nacelle.

The nacelle generally has a tubular structure comprising an air intake upstream from the turbojet engine, a middle section intended to surround a fan of the turbojet engine and its casing, and a downstream section intended to surround the combustion chamber of the turbojet engine and, if applicable, housing thrust reverser means. It may end with a jet nozzle whereof the outlet is situated downstream from the turbojet engine.

Modern nacelles are intended to house a dual flow turbojet engine capable of using the rotating blades of the fan to generate a hot air flow (also called primary flow) coming from the combustion chamber of the turbojet engine, and a cold air flow (secondary flow) that circulates outside the turbojet engine through an annular passage, also called a tunnel, formed between the fairing of the turbojet engine and an inner wall of the nacelle. The two flows of air are ejected from the turbojet engine through the rear of the nacelle.

The role of a thrust reverser is to improve the braking capacity of an airplane during landing by reorienting at least part of the thrust generated by the turbojet engine forward. During that phase, the reverser obstructs the cold flow tunnel and orients said flow toward the front of the nacelle, thereby generating a counterthrust added to the braking of the wheels of the airplane.

The means used to perform this reorientation of the cold flow vary depending on the type of reverser. However, in all cases, the structure of a reverser comprises moving cowls that can be moved between the deployed position in which they open a passage in the nacelle intended for the deflected flow on the one hand, and a retracted position in which they close that passage on the other hand. These cowls may perform a deflecting function (pivoting door reverser) or simply serve to activate other deflecting means.

In the case of a grid reverser, also called a cascade reverser, the flow of air is reoriented using cascade vanes, the cowl performing a simple sliding function aiming to expose or cover said vanes. Additional blocking doors, also called flaps, activated by the sliding of the cowling, generally allow the tunnel to be closed downstream from the vanes so as to provide the reorientation of the cold flow.

In order to support the moving reverser cowls and connect the downstream section to the rest of the nacelle, and in particular the middle section by means of the fan casing, the downstream section comprises stationary elements and in particular longitudinal beams connected upstream to a substantially annular assembly called the front frame, formed by one or more parts between the longitudinal beams, and intended to be fastened to the periphery of the downstream edge of the casing of the engine fan.

This front frame is connected to the fan casing by fastening means generally of the blade/groove type comprising a substantially annular flange, made in one or more parts, secured to the front frame and cooperating with a J- or V-shaped slot. The fastening assembly is commonly referred to as a J-ring.

More generally, the parts of the rear section that are kept stationary during flight, namely the inner structure as well as the outer structure of the downstream section, are generally connected to the middle section or the fan casing using such a blade/groove flanging system.

The technological background is illustrated by document GB 2,384,827. Such a device works for C-duct or D-duct nacelles, i.e., whereof the downstream structure is made in the form of two half-parts that are substantially semi-cylindrical, mounted so as to be able, in particular during maintenance operations, to be opened "butterfly style" by pivoting around a substantially longitudinal hinge line situated near a connecting pylon to an aircraft.

In such a configuration, a blade/groove type connection is of course extremely advantageous, since while providing longitudinal strength, this type of connection also allows relatively easy removal of the blade or the groove in a radial direction during opening of the half-parts.

Recently, nacelles having other configurations have been developed, and in particular O-duct nacelles. Such nacelles do not have two substantially semi-cylindrical half-parts, but a single substantially peripheral cowl with a quasi-annular shape.

In such a configuration, the opening of the downstream section is no longer done by pivoting around a hinge line, but by sliding along guide rails positioned on either side of the attachment pylon.

Such a nacelle is in particular described in documents FR 2,907,098, FR 2,911,372, and FR 2,952,908.

A connecting device of the blade/groove type is then no longer suitable for this type of O-duct nacelle, in which the rear part can slide during maintenance operations (O-duct nacelle) toward the rear of the nacelle in a substantially longitudinal direction thereof.

In fact, in such a nacelle configuration, one or more areas of the downstream section should be provided opening laterally so as to be able to move the flange away from the grooves and free the front frame from the casing.

One solution to this type of problem has been described in document FR 2,970,513.

SUMMARY

The present disclosure provides a device for connecting in particular a front frame of a downstream section of a turbojet engine nacelle to a fan casing, comprising at least one locking pin connected to a first assembly flange secured to the front frame or the fan casing, said locking pin having a shank designed to pass removably through a corresponding orifice of a second assembly flange secured to the fan casing or the front frame, characterized in that the connecting device comprises at least one retaining flange movably mounted between a locking position and an unlocking position and having at least one opening intended to be crossed through by the shank of the locking pin and to cooperate with a peripheral end groove of said locking pin, said opening to that end being configured such that, when the retaining flange is in the unlocked position, the openings has, at the pin, dimensions larger than those of the shank of the pin, thereby allowing it to be removed from the second assembly flange, and when the retaining flange is in the locked position, said opening has, at the pin, dimensions larger than the thickness of the pin at its peripheral groove but smaller than the overall thickness of the shank of the orifice of the second flange, thereby preventing its removal.

Thus, by using locking pins, the connecting device according to the present disclosure allows retention and axial disengagement compatible with an O-duct nacelle providing for unlocking in a longitudinal direction of the nacelle.

This type of locking also allows quick engagement and disengagement by simply moving the retaining flange. This type of locking also allows improved tightening of the assembly flanges and makes it possible to provide sealing of the junction.

Advantageously, the locking pin is connected to the first assembly flange using a spigot passing through an orifice corresponding to the first flange and maintained by retaining means of the nut type.

In one form, the orifice of the first flange passed through by the spigot of the locking pin is equipped with at least one elastic washer serving as pre-stressing means.

According to one alternative form, the spigot forms a shank of the pin and in that the retaining means are a movable retaining flange according to claim 1.

According to other features of the present disclosure, the device comprises multiple locking pins distributed on the periphery of the assembly flanges.

In still one form, at least one assembly flange is at least partially annular.

Advantageously, the retaining flange is at least partially annular.

Of course, depending on the nacelle designs, the assembly flanges and/or retaining flange may be segmented, partially peripheral, etc.

Additionally and advantageously, the device comprises means for centering the assembly flanges.

In one form, the retaining flange is associated with driving means, in particular of the rack and pinion type.

In another form, the orifice of the retaining flange has a border with a variable thickness forming at least one ramp capable forcing the assembly flanges to come closer together during the passage of the retaining flange from its unlocking position to its locking position.

The present disclosure also relates to a propulsion assembly comprising a turbojet engine housed inside a nacelle, said nacelle comprising a downstream section attached to a fan casing of the turbojet engine using at least one connecting device according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 1 and 2 are front and transverse cross-sectional views, respectively, of a connecting device according to the present disclosure in the locked configuration; and FIGS. 3 and 4 are front and transverse cross-sectional views of the connecting device of FIGS. 1 and 2 in the unlocked configuration.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A nacelle constitutes a tubular housing for a turbojet engine and generally comprises an upstream air intake section, a middle section surrounding a fan of the turbojet engine, and a downstream section 100 surrounding a combustion chamber of the turbojet engine.

More specifically, the middle section surrounds the fan and has an inner wall formed by a casing 200 of the fan.

The downstream section 100 may house a thrust reverser device positioned in the extension of an upstream section for attachment to the rest of the nacelle, and in particular the middle section. In the case of a so-called smooth nacelle, with no thrust reverser device, there is only an upstream attachment section covering the entire downstream section 100.

As indicated in the preamble of the present disclosure, fastening the downstream section to the middle section strongly is requested. Depending on the configuration of the nacelle, it is demanded to be able to attach the downstream section and the middle section separately, in particular allowing opening by longitudinal translation of the downstream section.

The downstream section 100 is attached to the middle section 200 using a front frame 101, said front frame 101 in particular providing support for the thrust reverser device if necessary, comprising a substantially peripheral annular assembly flange 102.

This assembly flange 102 of the front frame 101 of the downstream section 100 is intended to be assembled with a corresponding assembly flange 202 connected to the fan casing 200.

The assembly of the two assembly flanges 102, 202 is done by a connecting device according to the present disclosure.

According to the present disclosure, and as shown in FIGS. 1 to 4, the connecting device comprises a set of locking pins 300 connected to the assembly flange 202 of the fan casing 200, each locking pin 300 having a shank 301 removably passing through a corresponding orifice 203 of the assembly flange 202 of the downstream section 200.

The shank 301 of the locking pin 300 has, at its end, a peripheral groove 302, the role of which will be explained later.

The attachment of the locking pin 300 to the assembly flange 202 of the fan casing 200 is done using a spigot passing through a corresponding orifice of the assembly flange 202 and maintained by retaining means of the nut type 306.

An elastic washer 307 is positioned between the nut 306 and the assembly flange 202 and serves as pre-stressing means.

This washer may of course be replaced equivalently by a spring, whether a helical or other spring.

Alternatively, the attachment of the locking pin 300 to the assembly flange 202 may be done similarly to the locking according to the present disclosure, which will now be described in detail.

According to the present disclosure, the connecting device comprises a retaining flange 304 capable of cooperating with the locking pins 300.

The retaining flange 304 has a shape adapted to the assembly flanges 102, 202 and, in the present case, has a substantially annular peripheral shape.

In order to provide locking, the retaining flange 304 is movably mounted between the locking position (FIGS. 1 and 2) and an unlocking position (FIGS. 3 and 4). The movement of the retaining flange 304 will be obtained by rotating the flange, and may if applicable be done using motorized drive means, for example of the rack and gear type.

For each locking pin 300, the retaining flange 304 has a corresponding opening 305 intended to be passed through by the shank 301 of the locking pin 300 and to cooperate with the peripheral groove 302 on the end of said locking pin 300.

To that end, the opening 305 of the retaining flange 305 is configured as follows:
when the retaining flange 304 is in the unlocked position, the opening 305 has, at the pin 300, dimensions larger than those of the shank 301 of the pin 300, thereby allowing it to be removed from the assembly flange 102 (and more specifically, allowing the removal of the assembly flange 102 by withdrawing the downstream section 200),
when the retaining flange 304 is in the locked position, said opening 305 has, at the pin 300, dimensions larger than the thickness of the pin 300 of its peripheral groove 302, but smaller than the overall thickness of the shank 301 at the orifice of the assembly flange 202, thereby preventing it from being removed.

As shown in front view in FIGS. 1 and 3, one suitable example opening configuration 305 is an opening in a keyhole-shaped, having a wide, substantially circular opening, allowing the pin 300 to pass, then laterally extended by a longitudinal opening having a reduced width smaller than the maximum width of the shank 301 of the pin 300 and therefore not allowing the removal of the latter.

Additionally and advantageously, the connecting device may be associated with means for centering assembly flanges 102, 202 and locking pins 300.

This re-centering may in particular be done by providing an assembly flange structure 102, 202 having a peripheral shoulder forming a centering cone.

It is also possible to provide, alternatively or additionally, the presence of re-centering fingers, for example positioned alternating with the locking pins 300.

During use, when one wishes to close the downstream section 100 of the nacelle and attach it to a fan casing 200, the following steps will be carried out.

The downstream section 100 is closed, and to that end is moved in the upstream direction until the two assembly flanges 102, 202 come into contact with each other.

In so doing, the assembly flange 102 is crossed through by the locking pins 300 at its corresponding orifices 203. Furthermore, the retaining flange 304 is in the unlocked position and the shanks 301 of the locking pins 304 also pass through the retaining flange 304 at the opening 305 in a zone of the opening having a sufficient width to allow the passage of the shank 301. Thus, ready to be locked, the connecting device according to the present disclosure may be actuated.

To that end, the retaining flange 304 is moved toward its locking position. In so doing, relative to the locking pin 300, the opening 305 moves and the opening zone has a sufficient width to allow the passage of the shank no longer to be located at said shank 301, but offset therefrom, said shank 301 then passing, owing to the presence of the peripheral groove 302, through a zone of the opening 305 whereof the width no longer allows its removal.

To unlock the device, the reverse procedure is carried out, the zone of the opening 305 allowing the passage of the shank 301 being returned across from said pin 300.

To assist with closing, it is possible to provide that the orifice 305 of the retaining flange 304 has a border with a variable thickness forming a ramp capable of forcing the assembly flanges 102, 202 to come closer together when the retaining flange goes from its unlocking position to its locking position.

Although the present disclosure has been described with one particular example form, it is of course in no way limited thereto and comprises all technical equivalents of the described means as well as combinations thereof if they are within the scope of the present disclosure.

Thus, the principles of the present disclosure may be extended to the connection of other members of a turbojet engine nacelle, such as the connection of a single-component air intake (i.e., in the form of the shroud), or a fan cowl, to the fan casing.

What is claimed is:
1. A device for connecting a front frame of a downstream section of a turbojet engine nacelle to a fan casing, comprising
at least one locking pin connected to a first assembly flange secured to the front frame or the fan casing, said at least one locking pin having a shank removably passing through a corresponding orifice of a second assembly flange secured to the fan casing or the front frame, and
at least one retaining flange movably mounted between a locking position and an unlocking position and having at least one opening, said at least one opening being crossed through by the shank of the locking pin and cooperating with a peripheral end groove of said locking pin,
wherein said at least one opening is configured such that, when the retaining flange is in the unlocking position, said at least one opening defines a longitudinal opening having a reduced width at one end and has, at the locking pin, dimensions larger than a width of the shank of the locking pin, thereby allowing the locking pin to be removed from the second assembly flange, and when the retaining flange is in the locking position, said at least one opening has, at the locking pin, dimensions larger than a width of a peripheral groove of the locking pin but smaller than the width of the shank of the locking pin, thereby preventing removal of the locking pin.
2. The device according to claim 1, wherein the orifice first flange comprises an orifice that is passed through by the shank of the locking pin, and further comprising at least one elastic washer positioned between the first flange and a nut of the locking pin, the elastic washer serving as pre-stressing means.

3. The device according to claim 1, further comprising multiple locking pins distributed on a periphery of the first and second assembly flanges.

4. The device according to claim 3, wherein at least one assembly flange is at least partially annular.

5. The device according to claim 4, wherein the retaining flange is at least partially annular.

6. A propulsion assembly comprising a turbojet engine housed inside a nacelle, said nacelle comprising a downstream section attached to a fan casing of the turbojet engine using at least one connecting device according to claim 1.

* * * * *